(Model.)

J. H. BAXTER.
PUTTING UP DRIED FISH.

No. 265,735. Patented Oct. 10, 1882.

WITNESSES:

INVENTOR:
J. H. Baxter
BY
ATTORNEYS.

UNITED STATES PATENT OFFICE.

JAMES H. BAXTER, OF PORTLAND, MAINE, ASSIGNOR TO HIMSELF AND CHARLES A. DYER AND DAVID L. FERNALD, BOTH OF SAME PLACE.

PUTTING UP DRIED FISH.

SPECIFICATION forming part of Letters Patent No. 265,735, dated October 10, 1882.

Application filed May 31, 1882. (Specimens.)

*To all whom it may concern:*

Be it known that I, JAMES H. BAXTER, of Portland, in the county of Cumberland and State of Maine, have invented a new and useful Improvement in Putting Up Dried Fish, and in packages therefor and other purposes, of which the following is a full, clear, and exact description.

This invention more particularly relates to putting up dried salt-fish—such as, for instance, prepared or boneless cod-fish; and it consists in a new article of trade or commerce, which is composed of fish compressed into a package of any given size or weight held together by binding-strings and inclosed in one or more wrappers for excluding the air, and in an outer wrapper which has inscribed on it, or on a label thereon, dividing lines or marks for cutting up the package into measured quantities without exposing the fish by removing the wrapper. This last feature of the invention is also applicable to packages of other food products.

Reference is to be had to the accompanying drawings, forming part of this specification, in which similar letters of reference indicate corresponding parts in all the figures.

Figure 1:
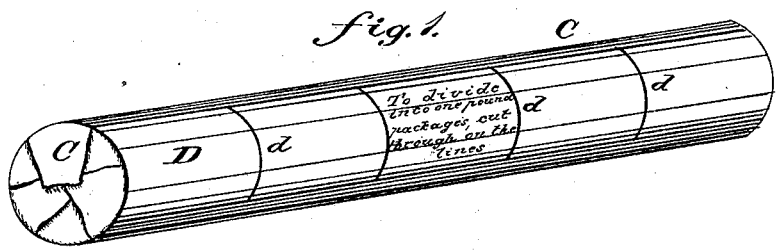
Figure 2:
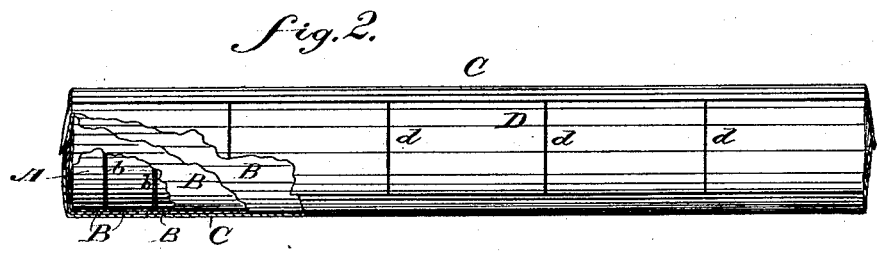
Figure 3:
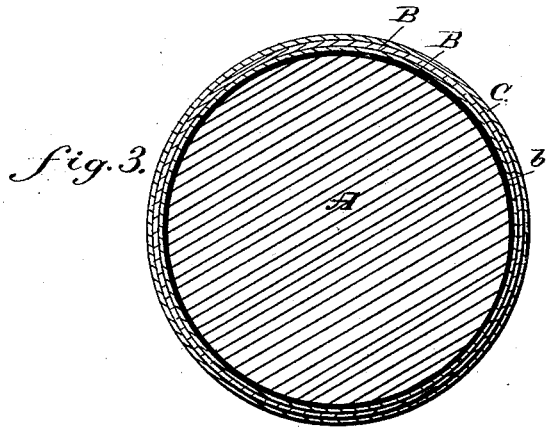

Figure 1 represents a view in perspective of a package of prepared fish put up in accordance with my invention. Fig. 2 is a partly broken or sectional longitudinal view of the same, and Fig. 3 a transverse section thereof upon a larger scale.

The package represented in the drawings is of cylindrical shape, and may be of five-pounds or any other convenient weight. The fish A within it is first compressed into a compact mass within a mold in a press and held firmly together by binding-strings $b$, applied at different points in its length and tied while the fish is under pressure. Such bound package of fish is then inclosed in one or more wrappers, B B, of waxed or other suitably-prepared paper which has the property of excluding the air, after which the whole is inclosed in an outer wrapper, C, of Manila paper or other suitable material. These wrappers prevent the exposure of the fish to air on the outside, and this, combined with the expulsion of the air from between the fish while in the press, keeps the fish from spoiling in hot weather or on long voyages. The dealer also is benefited by being enabled to keep the goods without spoiling or drying up and losing weight. On the exterior of the outer wrapper, C, or on a label, D, thereon, are inscribed or impressed a series of dividing lines or marks, $d$, which allow of the dealer cutting the package into specified or measured smaller parts without weighing to suit the requirements of customers, and this without objectionable exposure of the fish by removing the wrapper. Such mode of retailing the fish also avoids the handling of it either by the dealer or the customer.

Having thus fully described my invention, I claim as new and desire to secure by Letters Patent—

1. A package of boneless fish bound at intervals with strings and incased in wrapping-papers, one of which wrappers is marked to indicate where said package may be cut across to separate it into divisions of one pound each, or of any other unit of weight.

2. A package of boneless fish pressed into a solid mass of uniform size throughout its length and incased in a wrapper which is marked into equal divisions indicating where the package may be cut across to separate it into multiples of the whole package, as one-half, one-third, one-fourth, &c., as shown and described.

JAMES H. BAXTER.

Witnesses:
C. H. LEIGHTON,
A. H. HARDING.